United States Patent [19]

Masuda

[11] Patent Number: 5,781,592
[45] Date of Patent: Jul. 14, 1998

[54] SELECTIVE DIVERSITY SYSTEM

[75] Inventor: Atsushi Masuda, Sagamihara, Japan

[73] Assignee: Kabushiki Kaisha Toshiba, Kawasaki, Japan

[21] Appl. No.: 619,760

[22] PCT Filed: Sep. 28, 1994

[86] PCT No.: PCT/JP94/01599

§ 371 Date: Mar. 27, 1996

§ 102(e) Date: Mar. 27, 1996

[87] PCT Pub. No.: WO95/09495

PCT Pub. Date: Apr. 6, 1995

[30] Foreign Application Priority Data

Sep. 28, 1993 [JP] Japan ................... 5-241566

[51] Int. Cl.$^6$ ................... H04B 7/08; H04L 1/02
[52] U.S. Cl. ................... 375/347; 455/133; 455/135
[58] Field of Search ................... 375/347, 267; 455/133, 134, 132, 135, 277.1

[56] References Cited

U.S. PATENT DOCUMENTS

| | | | |
|---|---|---|---|
| 4,035,728 | 7/1977 | Ishikawa et al. | 455/134 |
| 4,513,412 | 4/1985 | Cox | 370/280 |
| 4,756,023 | 7/1988 | Kojima | 455/133 |
| 5,535,440 | 7/1996 | Clappier | 455/134 |
| 5,541,963 | 7/1996 | Nakagoshi | 375/347 |

FOREIGN PATENT DOCUMENTS

| | | |
|---|---|---|
| 0364 190 A | 4/1990 | European Pat. Off. |
| A 2-65420 | 3/1990 | Japan. |
| A 3-48533 | 3/1991 | Japan. |
| A 6-204925 | 7/1994 | Japan. |

OTHER PUBLICATIONS

Yoshihiko Akai, "Antenna Selecting Diversity System for Digital Mobile Communication", 1989 IEICE Spring National Conference Lecture Theses, vol. 2, p. 360, Mar. 1989.

Primary Examiner—Temesghen Ghebretinsae
Attorney, Agent, or Firm—Finnegan, Henderson, Farabow, Garrett & Dunner, L.L.P.

[57] ABSTRACT

A selective diversity apparatus in which a predetection diversity system is used and branches can be switched without generating a signal error, etc., even at the time the reception of a communication physical slot having a short preamble signal zone, and a control method thereof. When a control physical slot is received in which a preamble signal zone contained in a burst received is sufficiently longer than the time necessary for selecting and switching the branches, judgment and switching of the branches are executed in the preamble signal zone, and when a communication physical slot not having a sufficient time is received, judgement of the branches is made during reception of the burst and switching of the branches is made in a guard time immediately before the burst after one frame.

4 Claims, 9 Drawing Sheets

5,781,592

SELECTIVE DIVERSITY SYSTEM

TECHNICAL FIELD

This invention relates to a selective diversity apparatus, and a control method thereof, for digital mobile communication that utilizes a time division-multiplexed digital signal, and relates in particular to a selective diversity apparatus, and a control method thereof, that prevents signal errors by allowing the switching timing of the receiving circuit branch to be varied in response to the length of the preamble signal zone contained in the digital signal received.

BACKGROUND ART

The following are known examples of conventional digital mobile communication selective diversity systems:

1) A post-detection diversity system that is equipped with a plurality of receiving series (receiving circuit branches) and that subjects the receiving circuit branches to selection switching based on the reception quality from among the demodulation signals of each series; and 2) A pre-detection diversity system that effects receiving circuit branch selection switching at either the radio frequency (RF) signal or the intermediate frequency (IF) signal stage prior to detection.

The former, the post-detection diversity system, affords a good diversity effect, but is disadvantageous in that a plurality of receiving series are required until detection, and the latter, the pre-detection diversity system, is advantageous in that a single receiving series is adequate following switching, but is disadvantageous in that signal errors caused by phase non-contiguity in the radio frequency signal or the intermediate frequency signal occur when branch switching is performed during signal reception.

For this reason, when the latter, the pre-detection diversity system, has been adopted in the past, it has been necessary to perform receiving circuit branch switching so that signal errors do not become a problem, e.g., during preamble signal reception.

In digital mobile communication, however, this preamble signal zone is generally of considerable length in the control physical slot of the control channel, but is short in the communication physical slot of the communication channel, so that when branch selection and switching are to be performed in the preamble signal zone of this short communication physical slot, there are times when the branch switching is not completed in this preamble signal zone, which occasionally results in, for example, signal errors arising in branch switching.

In cases in which, for example, the received data is time division-multiplexed, moreover, a structure which receives another burst immediately prior to the received burst and which performs switching by selecting the branch with the most favorable characteristics at this time can also be considered, but this structure cannot be used for communication with another terminal for which the prior burst is completely different.

Conventional pre-detection diversity systems are thus advantageous in that a sole receiving series is adequate following branch switching, but are disadvantageous in that, when the preamble signal zone is short, the branch selection and switching processing are occasionally inadequate for this preamble signal zone, in which case, for example, signal errors caused by branch switching may occur.

SUMMARY OF THE INVENTION

An objective of this invention is thus to provide a selective diversity apparatus, and a control method thereof, that utilizes a pre-detection diversity system and that makes it possible to perform branch switching without, for example, signal errors, even during the reception of the communication physical slot of a communication channel with a short preamble signal zone.

To realize the above objective, this invention comprises a plurality of antennas; a plurality of receiving circuit branches respectively provided in association with the plurality of antennas, for receiving signals received by the respective antennas; a plurality of level detection means for detecting reception levels of the respective receiving circuit branches; judgment means for judging a receiving circuit branch having a highest reception level based on detection outputs of the plurality of level detection means; selection means for selecting one of the plurality of receiving circuit branches based on a judgment output of the judgment means; and judgment selection control means for performing judgment by means of the judgment means based on a first timing and for performing selection by means of the selection means based on a second timing.

The receiving circuit branch comprises a radio frequency circuit for processing the signals received by the antennas and a frequency changing circuit for changing the radio frequency signal output from the radio frequency circuit to an intermediate frequency signal, and the level detection means detects the reception level based on the output of the frequency changing circuit.

The judgment means, moreover, is furnished with a comparison circuit for comparing the reception levels of each of the receiving branches, and judges the receiving circuit branch having the highest reception level based on the output of the comparison circuit.

The received signals of the antennas, moreover, are signals in the form of bursts that adopt a frame structure comprising a plurality of slots; the bursts contain a preamble signal in each slot, and guard times are provided between slots; the judgment selection control means establishes the first timing in the preamble signal period, and establishes the second timing in the guard time period.

The signals received by the antennas, moreover, are signals in the form of bursts that have a frame structure comprising a plurality of slots; the bursts contain preamble signals in each slot, and also contain communication physical slots and control physical slots, between which guard times have been established; the period of the preamble signal of the control physical slot is set to be longer than the period of the preamble signal of the communication physical slot. The judgment selection control means establishes the first timing and the second timing in the period of the preamble signal at the time of the reception of the control physical slot, sets the first timing to be identical to that for the reception of the control physical slot at the time of reception of the communication physical slot, and sets the second timing in the period of the guard time.

This invention, moreover, comprises a plurality of antennas for receiving signals in the form of bursts that comprise control physical slots and communication physical slots, in which each slot contains a preamble signal, a guard time is established between slots, and the period of the preamble signal of the control physical slot is set to be longer than the period of the preamble signal of the communication physical slot; a plurality of receiving circuit branches respectively provided in association with the plurality of antennas, for receiving signals received by the respective antennas; a plurality of level detection means for detecting reception levels of the receiving circuit branches; judgment means for judging a receiving circuit branch having a highest reception level based on the detection outputs of the plurality of level detection means; selection means for selecting one of the plurality of receiving circuit branches based on a judgment output of the judgment means; and judgment selection control means for performing judgment by means of the judgment means based on a first timing in the period of the preamble signal of the control physical slot and for performing selection by means of the selection means based on a second timing in the period of the preamble signal of the control physical slot for the reception of the control physical slot, and for performing judgment by means of the judgment means based on the same timing as that of the first timing and for performing selection by means of the selection means based on a third timing in the period of the guard time for the reception of the communication physical slot.

The signal in burst form that is received by the antenna comprises a signal having a superframe structure in which frames comprising control physical slots and communication physical slots have been subjected to multiframe conversion.

This invention, moreover, comprises a method for controlling a selective diversity apparatus that is equipped with a plurality of antennas for receiving signals in the form of bursts that comprise control physical slots and communication physical slots, in which each slot contains a preamble signal, a guard time is established between slots, and the period of the preamble signal of the control physical slot is set to be longer than the period of the preamble signal of the communication physical slot; a plurality of receiving circuit branches respectively provided in association with the plurality of antennas, for receiving the signals received by the respective antennas; a plurality of level detection means for detecting the reception levels of the receiving circuit branches; judgment means for deciding the receiving circuit branch having the largest reception level based on the detection outputs of the plurality of level detection means; and selection means for selecting one of the plurality of receiving circuit branches based on the judgment output of the judgment means; wherein the method comprises a first step in which judgment is performed by means of the judgment means based on a first timing in the period of the preamble signal of the control physical slot and selection is performed by means of the selection means based on a second timing in the period of the preamble signal of the control physical slot for the reception of the control physical slot; and a second step in which judgment is performed by means of the judgment means based on a timing that is the same as the first timing and selection is performed by means of the selection means based on a third timing in the period of the guard time for the reception of the communication physical slot.

The signal that is in the form of a burst and that is received by the antenna is composed of a signal having a superframe structure obtained by subjecting to multiframe conversion frames comprising control physical slots and communication physical slots.

With this invention, the judgment by means of the judgment means and the selection of the receiving circuit branch by means of the selection means are performed when a control physical slot having a sufficiently long preamble signal zone is received, i.e., switching is performed in this preamble signal zone, judgment is performed by means of the judgment means based on a timing that is the same as that for the reception of the control physical slot, and receiving circuit branch selection is performed by means of the selection means when a communication physical slot having a short preamble signal zone is received, i.e., switching is performed at the next guard time.

This makes it possible to perform branch switching without causing, for example, signal errors, even when there are phase differences among the plurality of receiving circuit branches.

BEST MODE FOR CARRYING OUT THE INVENTION

One embodiment of the selective diversity apparatus and control method thereof which pertains to this invention is described in detail below with reference to the appended figures.

Figure 1:
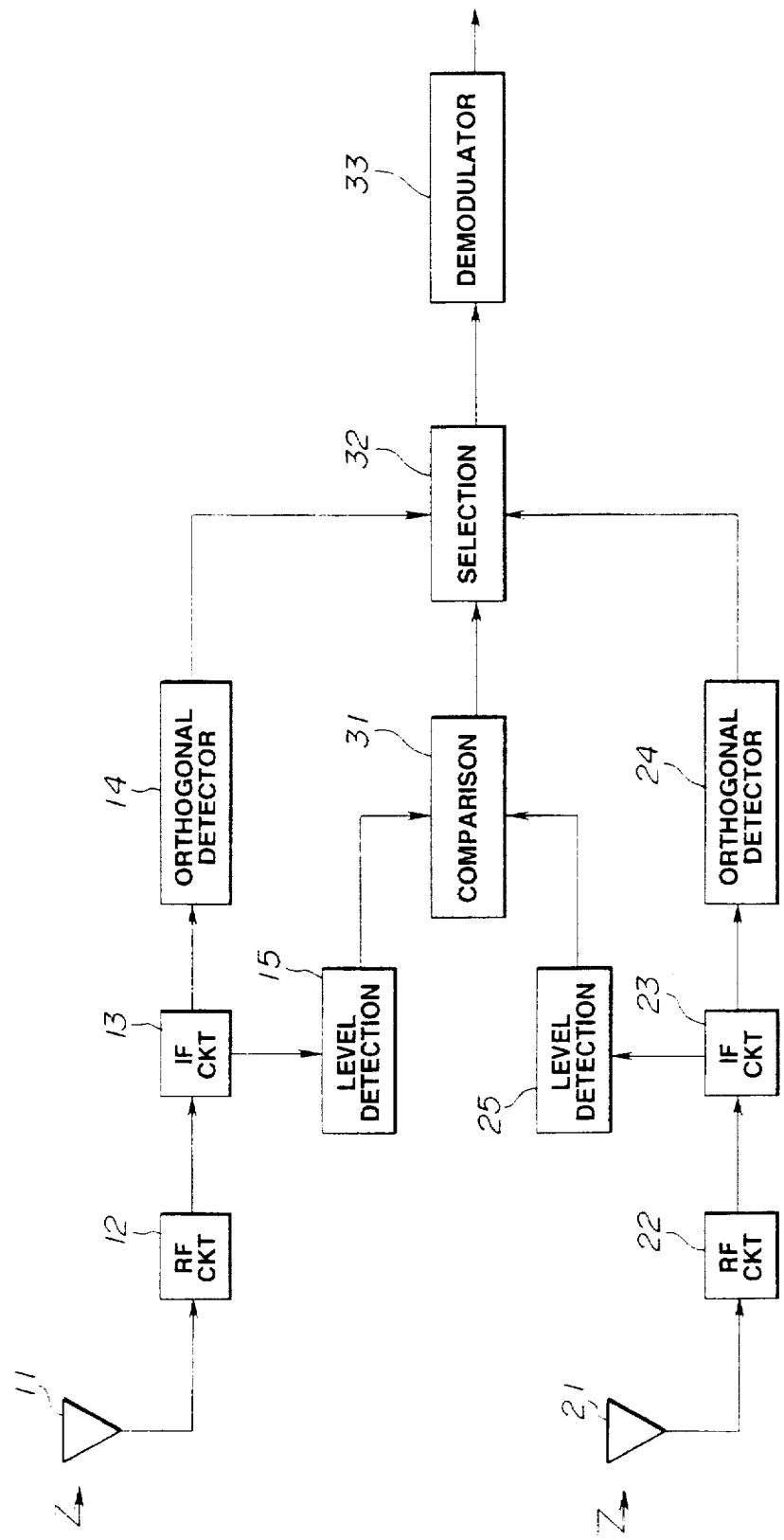
FIG. 1 is a block diagram depicting an embodiment of the selective diversity apparatus which pertains to this invention.

FIG. 1 is a block diagram depicting one embodiment of the selective diversity apparatus which pertains to this invention.

The selective diversity apparatus depicted in FIG. 1 may be used in, for example, the radio frequency receiving system of a base station of a digital mobile communication apparatus. The selective diversity apparatus depicted in FIG. 1 comprises an antenna 11, a radio frequency circuit (RF circuit) 12, an intermediate frequency circuit (IF circuit) 13, a first receiving circuit branch composed of an orthogonal detector 14, an antenna 21, a radio frequency circuit (RF circuit) 22, an intermediate frequency circuit (IF circuit) 23, and a second receiving circuit branch composed of an orthogonal detector 24.

It also comprises a level detector 15 for detecting the reception level of the intermediate frequency circuit (IF circuit) 13 and a level detector 25 for detecting the reception level of the intermediate frequency circuit (IF circuit) 23; a comparator 31 compares the detection level of the level detector 15 and the detection level of the level detector 25.

A selector 32 selects either the first receiving circuit branch or the second receiving circuit branch depending on the result of the comparison of this comparator 31.

Specifically, the comparator 31 compares the detection level of the level detector 15 with the detection level of the level detector 25, and the selector 32 selects the output of the first receiving circuit branch, i.e., the output of the orthogonal detector 14, when the detection level of the level detector 15 is higher than the detection level of the level detector 25, and selects the output of the first receiving circuit branch, i.e., the output of the orthogonal detector 24, when the detection level of the level detector 25 is higher than the detection level of the level detector 15.

The output of the first receiving circuit branch or the second receiving circuit branch that has been selected by the selector 32 is provided to a subsequent-stage demodulator 33.

The digital mobile wireless apparatus used for this embodiment comprises control physical slots as well as communication physical slots; each slot contains a preamble signal, and guard times are established between slots; a signal in the form of a burst in which the period of the preamble signal of the control physical slot is longer than the period of the preamble signal of the communication physical slot is used, and the antennas 11 and 21 receive this burst.

The selective diversity apparatus of this embodiment is structured so that the selection timing of the first receiving circuit branch and the second receiving circuit branch in the selector 32, i.e., the switching timing, is varied depending on whether the control physical slot or the communication physical slot is received.

Specifically, although the comparison timings between the detection level of the level detector 15 and the detection level of the level detector 25 in the comparator 31, i.e., the judgment timings that determine whether or not the first or second receiving circuit branch is used, are set to be the same, the selection timings of the first and second receiving circuit branches in the selector 32, i.e., the switching timings, vary depending on whether the control physical slot or the communication physical slot is received.

Figure 2:
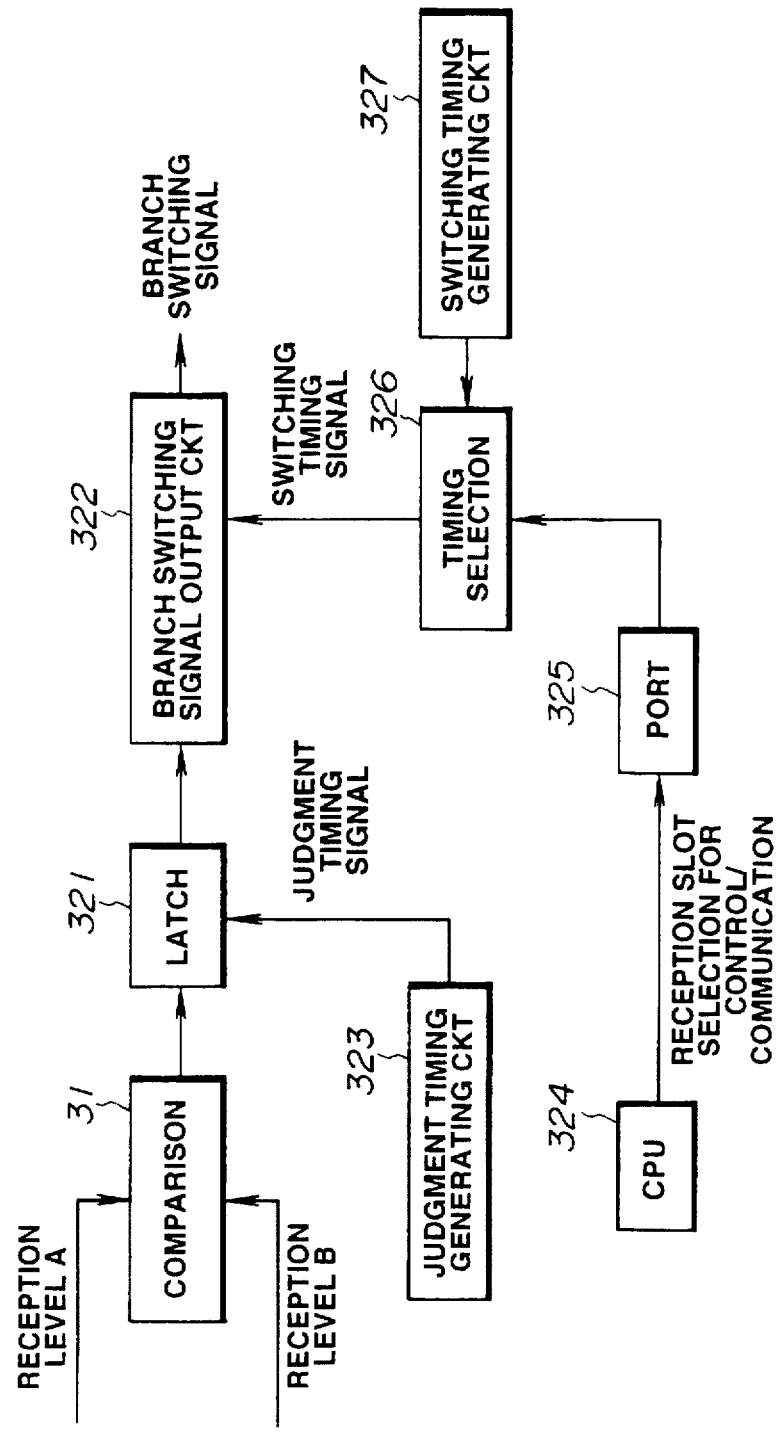
FIG. 2 is a block diagram depicting a detailed structure of a circuit for performing branch judgment and selection in the selection component depicted in FIG. 1.

FIG. 2 depicts the detailed structure of the controller that performs branch selection, i.e., switching, in the selector 32 shown in FIG. 1. This circuit is furnished with a latch circuit 321 for latching the comparison output of the comparator 31 shown in FIG. 1; a judgment timing generation circuit 323 for generating a judgment timing signal that depicts the latch timing of the latch circuit 321, i.e., the branch selection judgment timing; a switching timing generation circuit 327 for generating a switching timing signal that shows the switching timing of branch switching; a timing selector 326 for selecting the switching timing signal generated by the switching timing generation circuit 327, a branch switching signal output circuit 322 for outputting a branch switching signal based on the signal latched by the latch circuit 321 using the switching timing signal selected by the timing selector 326 as a trigger; a central processing unit (CPU) 324; and a port 325 for inputting the output of this central processing unit 324.

In FIG. 2, the comparator 31 compares the reception level A that is the detection level of the level detector 15 of the first receiving circuit branch with the reception level B that is the detection level of the level detector 25 of the second receiving circuit branch, and latches this comparison result to the latch circuit 321 based on the timing of the judgment timing signal generated by the judgment timing generation circuit 323. The judgment timing generation circuit 323 is structured so that a judgment timing signal is generated in the period of the preamble signal of the control physical slot.

The central processing unit (CPU) 324 chooses either the control physical slot or the communication physical slot based on the sequence of the burst signal that is received, and outputs the result to the timing selector 326 via the port 325.

The timing selector 326 selects the switching timing signal generated by the switching timing generation circuit 327 in the period of the preamble signal of the control physical slot and outputs it to the branch switching signal output circuit 322 when the receiving slot for the signal from the port 325 is shown to be the control physical slot; when the receiving slot for the signal from the port 325 is shown to be the communication physical slot, [the timing selector 326] selects the switching timing signal generated by the switching timing generation circuit 327 in the guard time after one frame of the communication physical slot and outputs it to the branch switching signal output circuit 322.

The branch switching signal output circuit 322 creates a branch switching signal based on the signal latched to the latch circuit 321, and outputs it based on the timing of the switching timing signal provided by the timing selector 326.

Specifically, according to the circuit shown in FIG. 2, the comparison result of the comparison circuit 31 is latched based on the timing of the judgment timing signal generated by the judgment timing generation circuit 323, i.e., the timing in the period of the preamble signal of the control physical slot, both when the control physical slot is received and when the communication physical slot is received, but the branch switching signal is output from the branch switching signal output circuit 322 when the control physical slot is received based on the timing in the period of the preamble signal of the control physical slot, and is output when the communication physical slot is received based on the timing in the period of the guard time of the communication physical slot after one frame.

Figure 3:
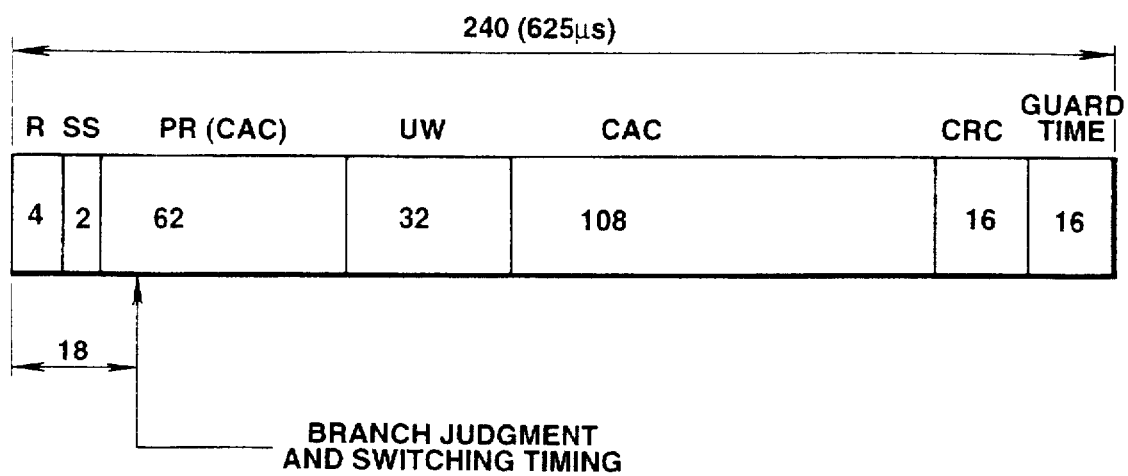
FIG. 3 is a diagram depicting the control physical slot received by the control channel, and also branch selection and switching timing.
Figure 4:
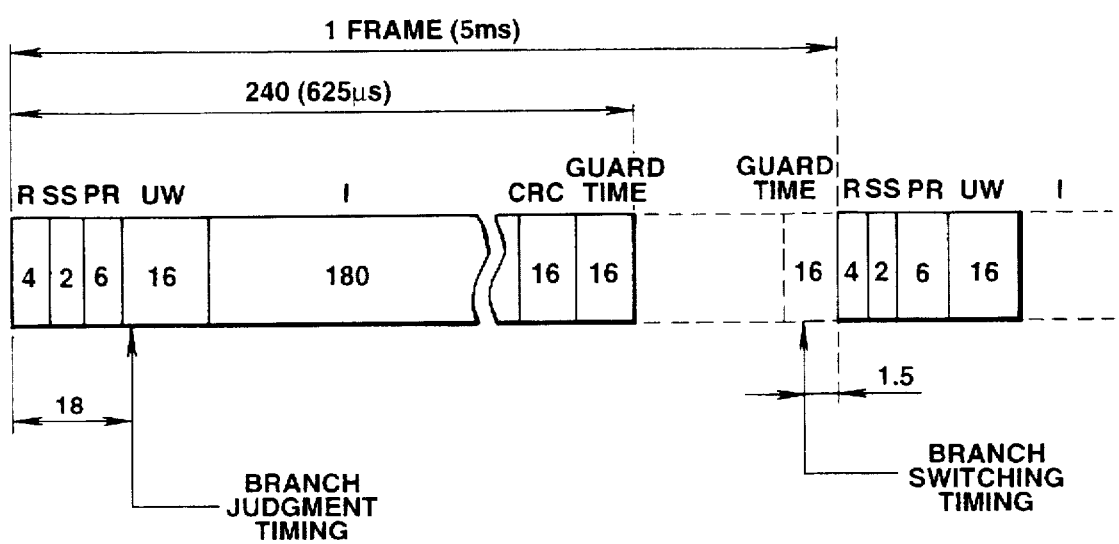
FIG. 4 is a diagram depicting the communication physical slot received by the communication channel in digital mobile communication, and also branch judgment and switching timing.
Figure 5:
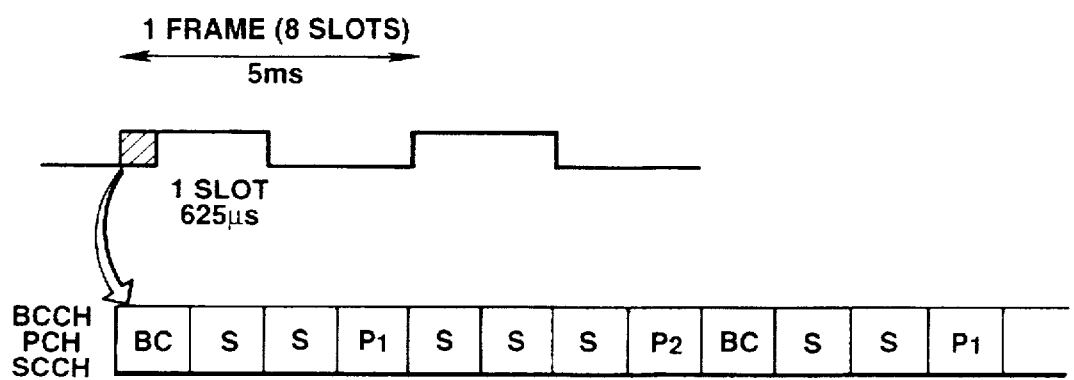
FIG. 5 is a frame structure diagram depicting the LCCH superframe structure utilized in digital mobile communication.

FIG. 3 depicts one example of the control physical slot used by the digital mobile communication apparatus used in this embodiment, and FIG. 4 shows one example of a communication physical slot. FIG. 5, moreover, shows the LCCH superframe structure used by the digital mobile communication apparatus used in this embodiment.

The operation of the selective diversity apparatus shown in FIGS. 1 and 2 is described in further detail below with reference to FIGS. 3 through 5.

The control physical slot shown in FIG. 3 comprises a 4-bit burst transient response time bit R, a 2-bit start symbol bit SS, a 62-bit preamble bit PR, a 32-bit synchronous word bit UW, a 108-bit control signal bit CAC, and a 16-bit check bit CRC; a 16-bit guard time bit is provided after the check bit CRC.

The communication physical slot shown in FIG. 4 comprises a 4-bit burst transient response time bit R, a 2-bit start symbol bit SS, a 6-bit preamble bit PR, a 16-bit synchronous word bit UW, a 180-bit information signal bit I, and a 16-bit check bit CRC; a 16-bit guard time bit is provided after the check bit CRC.

The LCCH superframe structure used for the digital mobile communication apparatus used for this embodiment and shown in FIG. 5 establishes the following values: nSG=2, nSUB=4, nPCH=3, and nGROUP=2; this is consequently a multiframe structure in which 1-frame, 8 slot is the basic frame unit, 1 slot is 625 μs, one frame is 5 ms, and the slots appear every 150 ms; overall, an LCCH superframe structure that repeats BC, S, S, P1, S, S, S, and P2 at 1.2 s is used.

Here, BC represents the system information notification message (BCCH), S represents link channel establishment request and link channel allocation (SCCH), and P1 and P2 represent incoming calls (PCH).

Looking at the slot structure and the frame structure shown in FIGS. 3 through 5, it is possible for the preamble bit PR of the control physical slot to be considerably long, at 62 bits, as shown in FIG. 3, and thus to perform branch selection and switching in the period of this preamble bit PR, but when the preamble bit PR of the communication physical slot is a short 6 bits, as shown in FIG. 4, then it is not possible to perform branch selection and switching in the period of this preamble bit PR.

When an LCCH superframe structure such as that shown in FIG. 5 is adopted, moreover, communication physical frames appear every 5 ms, but since the control physical slots appear intermittently, at 1.2 s, the time required for inter-terminal connection is lengthened when accurate reception is not possible in a single time.

In this embodiment, therefore, when the preamble bit PR is made sufficiently long, it is possible to perform branch selection and switching in the period of this preamble bit PR; when accurate reception is not possible in a single time, then when a control physical slot requiring a long time for inter-terminal connection is received, branch selection and switching is performed in the period of the preamble bit PR; when the preamble bit PR is short, then when the communication physical slots that appear every 5 ms are received, branch judgment is performed based on a timing that is the same as that for when the control physical slot is received, and branch switching is performed in the guard time following one frame.

Specifically, as shown in FIG. 3, when the control physical slot is received, branch judgment and switching is performed at the 18th bit from the head of the burst transient response time bit R of the control physical slot, i.e., in the period of the preamble bit PR of the control physical slot.

Specifically, in the structure shown in FIG. 2, a judgment timing signal is generated by the judgment timing generation circuit 323 based on the timing of the 18th bit from the head of the burst transient response time bit R of the control physical slot, branch judgment is performed by latching the comparison result of the comparator 31 to the latch circuit 321 in sync with this judgment timing signal, the switching timing signal generated by the switching timing generation circuit 327 is selected by the timing selector 326 in the period of the preamble bit PR of this control physical slot and is provided to the branch switching signal output circuit 322, a branch switching signal is generated in the period of the preamble bit PR of this control physical slot by the branch switching signal output circuit 322, and branch switching is performed based on this branch switching signal.

By contrast, as shown in FIG. 4, when the communication physical slot is received, branch judgment is performed based on the same timing as when the control physical slot is received, and branch switching is performed in the period of the guard time following one frame.

Specifically, in the structure shown in FIG. 2, a judgment timing signal is generated by the judgment timing generation circuit 323 based on the timing of the 18th bit from the head of the burst transient response time bit R of the communication physical slot in the same manner as when the control physical slot is received, i.e., in the period of the synchronous word bit UW of the communication physical slot, and the comparison result of the comparator 31 is latched to the latch circuit 321 in sync with this judgment timing signal to perform branch judgment, the switching timing signal generated by the switching timing generation circuit 327 is selected by the timing selector 326 in the period of the guard time following one frame of this communication physical slot and is provided to the branch switching signal output circuit 322, a branch switching signal is generated by the branch switching signal output circuit 322 in the period of the guard time following one frame of the communication physical slot, and branch switching is performed based on this branch switching signal.

In this case, the switching cycle of the branch at the time of communication channel reception is 5 ms, which is sufficiently shorter than the phasing cycle of 0.1 s.

In this way, this embodiment is structured so that branch judgment and switching are performed in the preamble signal zone at the time of reception of a control physical slot for which the preamble signal zone contained in the burst received is sufficiently longer than the time required for branch judgment and switching, branch judgment is performed during burst reception when a communication physical slot |for which this interval| is not sufficient is received, and branch switching is performed based on the guard time immediately prior to the burst in question after one frame; it is consequently possible to perform branch switching without signal errors, even when there are phase differentials among the plurality of system reception signals, and it is moreover possible to integrate what comes after the branch switching point into a single system, which makes it possible to obtain a less expensive, lower power consumption, and more compact selective diversity apparatus.

Figure 6:
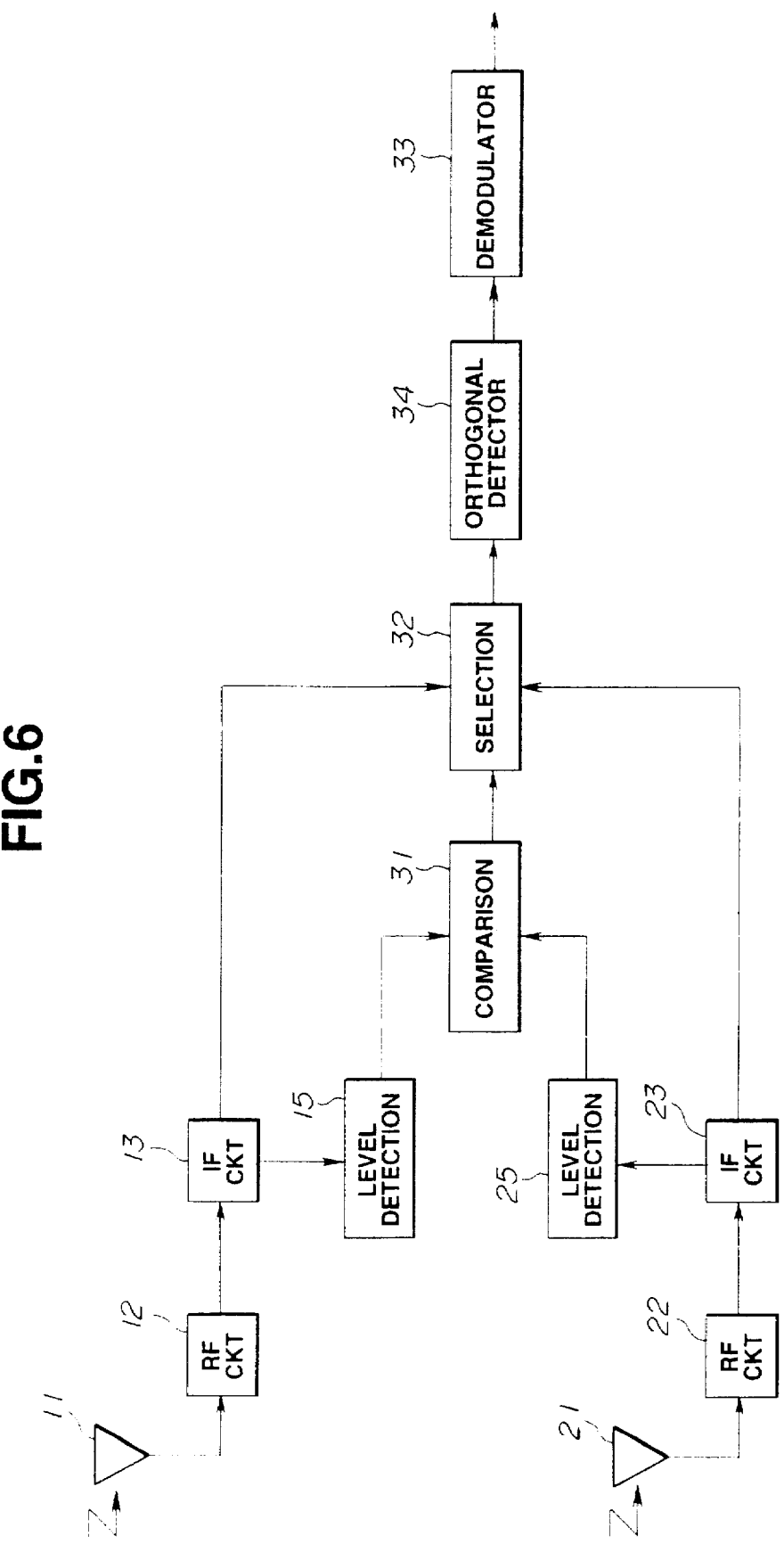
FIG. 6 is a block diagram depicting another embodiment of a selective diversity apparatus which pertains to this invention.

In the embodiment, moreover, the first receiving circuit branch comprises an antenna 11, a radio frequency circuit (RF circuit) 12, an intermediate frequency circuit (IF circuit) 13, and an orthogonal detector 14, and the second receiving circuit branch comprises an antenna 21, a radio frequency circuit (RF circuit) 22, an intermediate frequency circuit (IF circuit) 23, and an orthogonal detector 24; as shown in FIG. 6, however, an orthogonal detector 34 is provided instead of the orthogonal detector 14 and the orthogonal detector 24, the selector 32 either selects the output of the intermediate frequency circuit (IF circuit) 13 as the output of the first receiving circuit branch or selects the output of the intermediate frequency circuit (IF circuit) 23 as the output of the second receiving circuit branch, and the output of this selector 32 is then provided to the demodulator 33 via the orthogonal detector 34.

Figure 7:
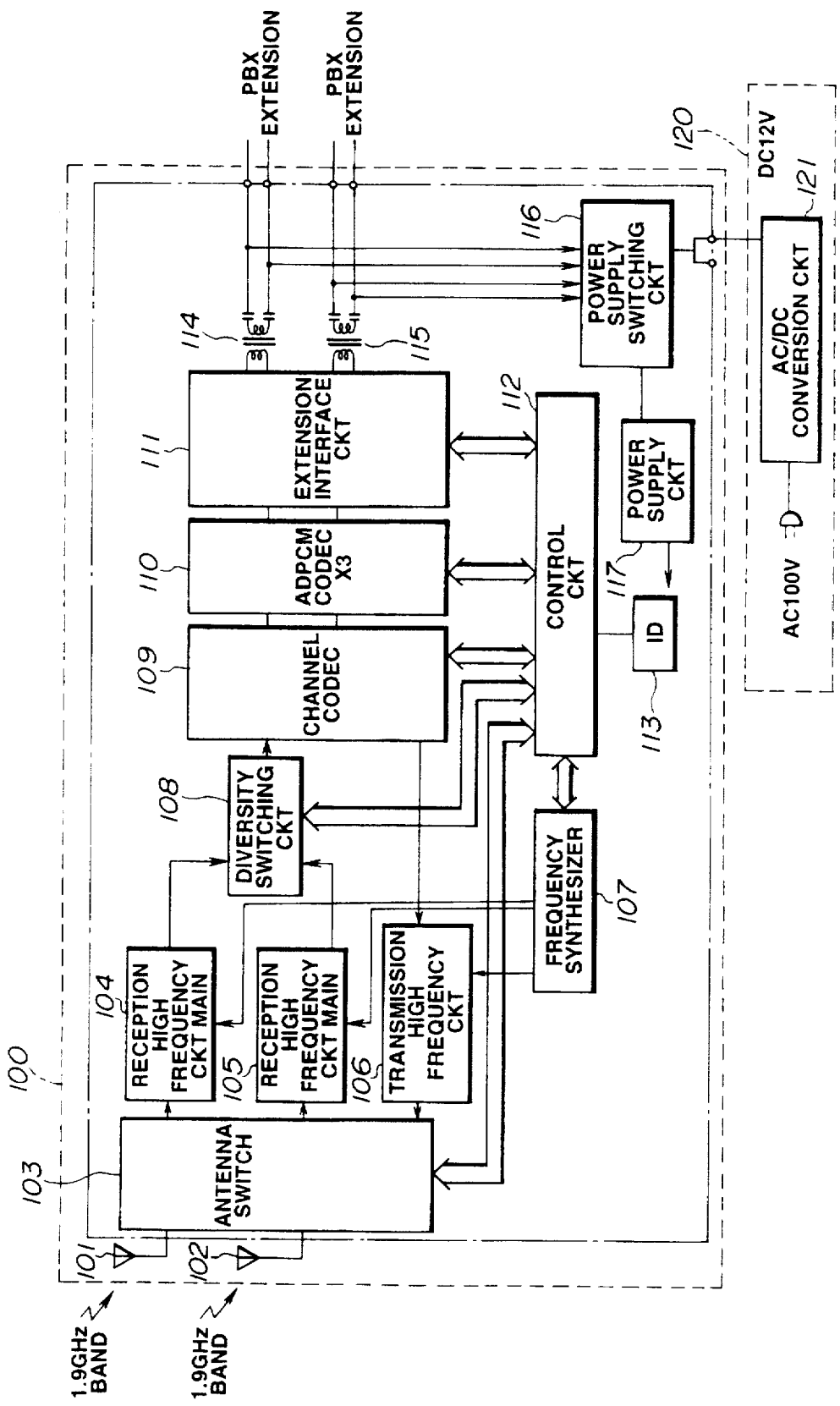
FIG. 7 is a block diagram depicting a simplified overall structure of a base station of a digital mobile communication apparatus in which the selective diversity apparatus of this invention is utilized.
Figure 9:
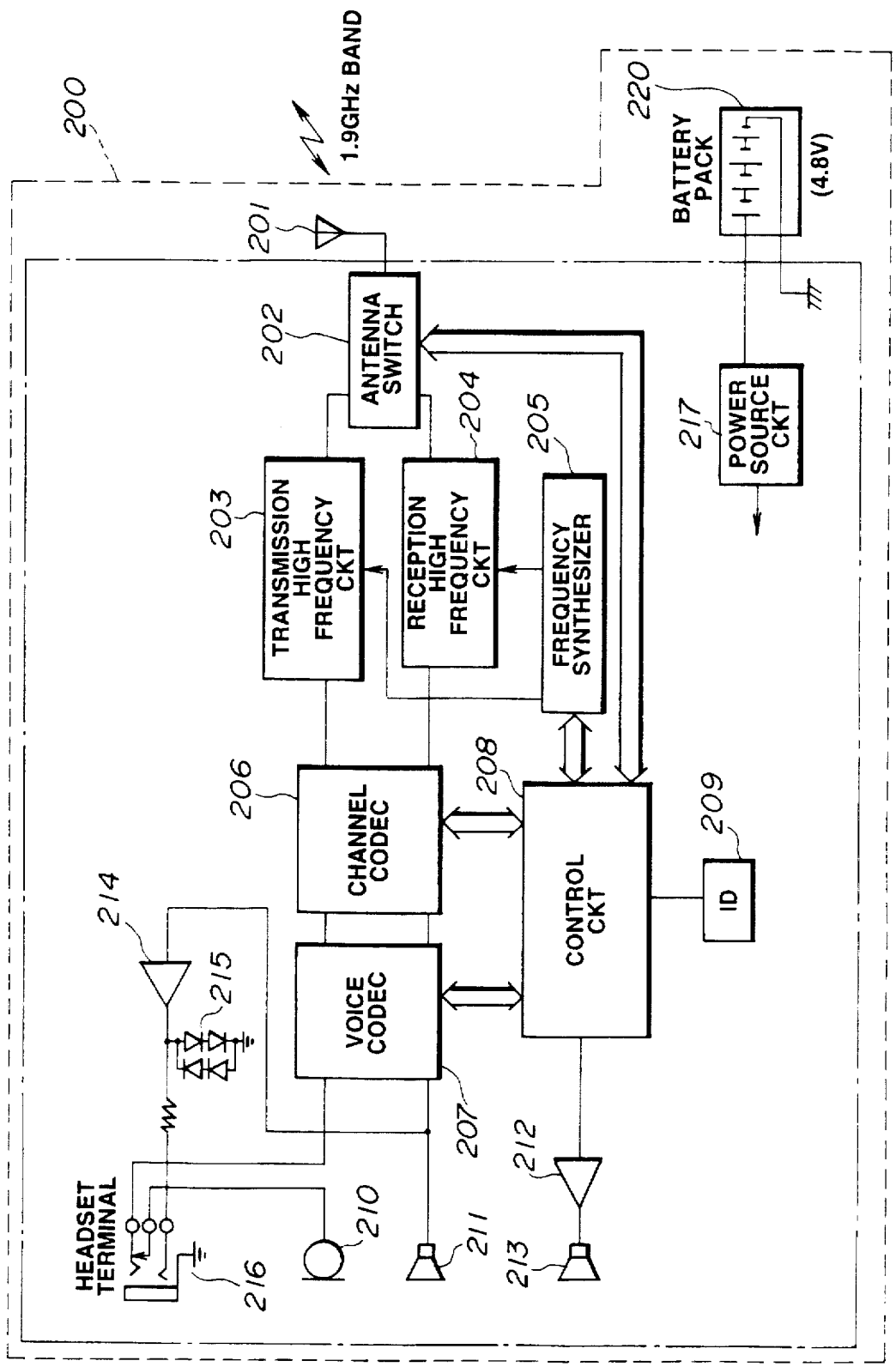
FIG. 9 is a block diagram depicting a simplified overall structure of a mobile station of a digital mobile communication apparatus in which the selective diversity apparatus of this invention is utilized.

FIG. 7 shows the overall structure of a base station of a digital mobile communication apparatus constructed using the selective diversity apparatus of this invention, and FIG. 9 shows the overall structure of a mobile station that is connected to this base station by means of a radio frequency line.

The base station 100 of the digital mobile communication apparatus shown in FIG. 7 transmits and receives 1.9 GHz band signals, and is furnished with two antennas 101 and 102, with two receiving high frequency circuits 104 and 105, and with a single transmission high frequency circuit 106; the two reception high frequency circuits 104 and 105 and the single transmission high frequency circuit 106 are connected to the two antennas 101 and 102 via an antenna switch 103.

The outputs of the two reception high frequency circuits 104 and 105, moreover, are connected to a channel CODEC 109 via a diversity switching circuit 108, the channel CODEC 109 is connected to an extension interface circuit 111 via an ADPCM CODEC 110, the extension interface circuit 111 is connected to the extension terminal of a private branch exchange (PBX) not shown in the figures via interface transformers 114 and 115, and the output of the channel CODEC 109 is connected to the transmission high frequency circuit 106.

The output of a frequency synthesizer 107 is provided to the two reception high frequency circuits 104 and 105 and to the single transmission high frequency circuit 106.

A control circuit 112, moreover, is connected to the antenna switch 103, the diversity switching circuit 108, the channel CODEC 109, the ADPCM CODEC 110, the extension interface circuit 111, and the frequency synthesizer 107, and the operation of these circuits is controlled by this control circuit 112.

An ID memory 113 for storing ID codes for identifying this base station 100 is also connected to the control circuit 112.

A power source 120 having an AC/DC conversion circuit 121 for converting AC 100 V to DC 12 V is connected to this base station 100, moreover, and the output of this AC/DC conversion circuit 121 is provided to a power supply switching circuit 116 of the base station 100; the power supply switching circuit 116 switches between the output of the AC/DC conversion circuit 121 and the PBX power source and supplies it to the power source circuit 117; the power source circuit 117 is structured so as to supply power to each component of the base station 100.

With such a structure, the two reception high frequency circuits 104 and 105 and the diversity switching circuit 108 constitute the selective diversity apparatus which pertains to this invention.

Specifically, the diversity switching circuit 108 of FIG. 7 is structured so as to make it possible to decide which of the two reception high frequency circuits 104 and 105 to use, depending on the receiving levels of the two reception high frequency circuits 104 and 105, and to thereby perform switching; the judgment of which of the two reception high frequency circuits 104 and 105 to use is performed based on the fixed timing of the burst signal received by the antennas 101 and 102, and the switching thereof is performed in the preamble signal zone when a control physical slot for which the preamble signal zone contained in the received burst is sufficiently longer than the time required for branch judgment and switching is received, and is performed in the guard time immediately prior to the burst in question after one frame when a communication physical slot for which [the preamble signal interval] is not sufficient is received. The control is performed by means of the control circuit 112 in the structure shown in FIG. 7.

Figure 8:
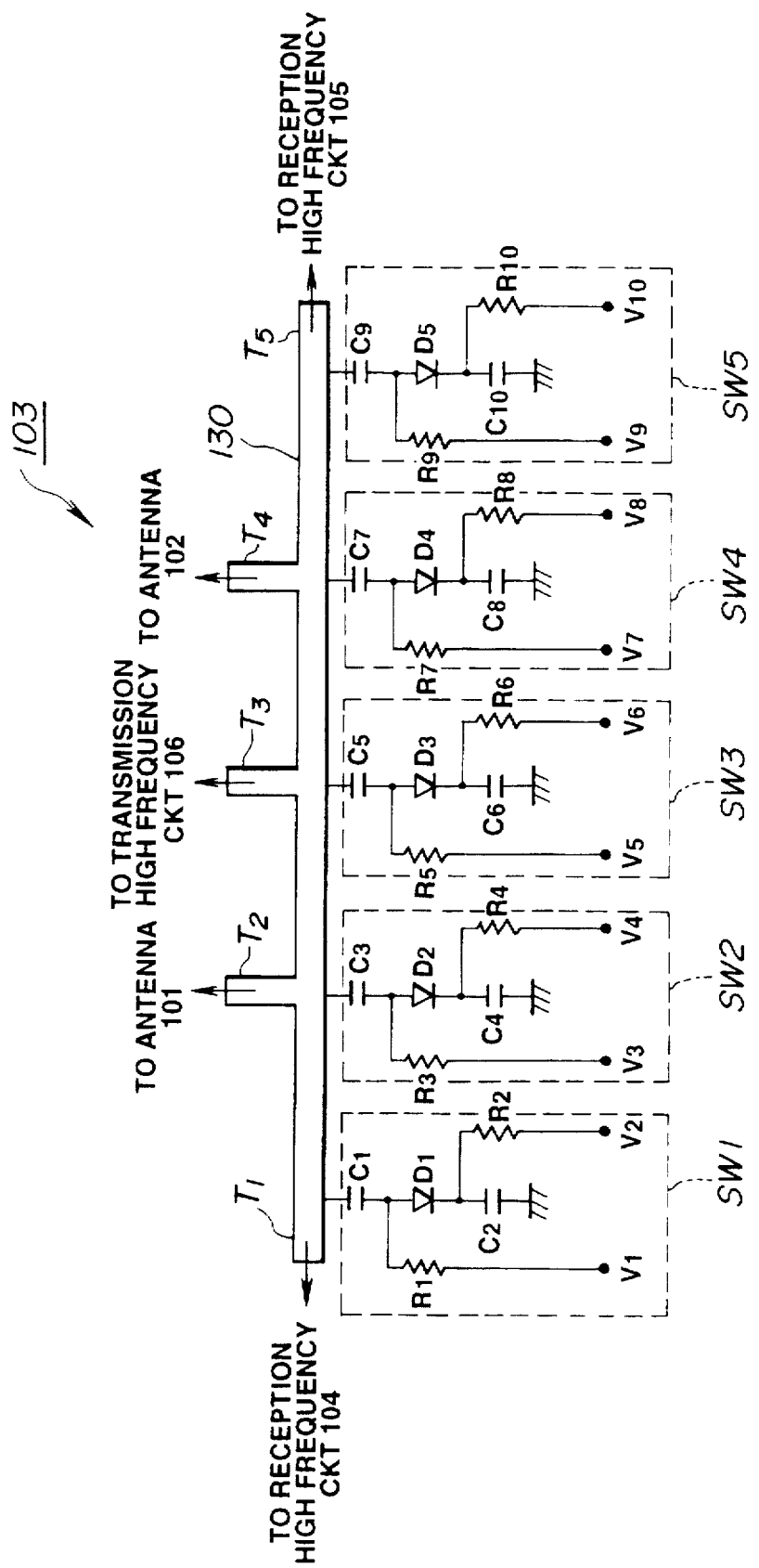
FIG. 8 is a circuit diagram depicting a structural example of the antenna switch depicted in FIG. 7.

FIG. 8 depicts a detailed structural example of the antenna switch 103 shown in FIG. 7. The antenna switch 103 shown in FIG. 8 comprises a strip line 130 that branches into 5 terminals T1 to T5 and high frequency switches SW1 to SW5 that are respectively provided to the terminals T1 to T5.

The reception high frequency circuit 104 is connected to the terminal T1 of the strip line 130, the antenna 101 is connected to the terminal T2, the transmission high frequency circuit 106 is connected to the terminal T3, the antenna 102 is connected to the terminal T4, and the reception high frequency circuit 105 is connected to the terminal T5.

The high frequency switches SW1 to SW5 act as diode switches to ground, in a high frequency manner, the respective terminals T1 to T5 of the strip line 130 (this state is referred to as high frequency switch off), and to separate them from the ground (this state is referred to as high frequency switch on).

Specifically, the high frequency switch SW1 comprises capacitors C1 and C2, resistors R1 and R2, and a diode D1, and is turned on when −4 V is provided to the terminal V1 and +4 V is provided to the terminal V2, and is turned off when +4 V is provided to the terminal V1 and −4 V is provided to the terminal V2.

The high frequency switch SW2, moreover, comprises capacitors C3 and C4, resistors R3 and R4, and a diode D2, is turned on when −4 V is provided to the terminal V3 and +4 V is provided to the terminal V4, and is turned off when +4 V is provided to the terminal V3 and −4 V is provided to the terminal V4.

The high frequency switch SW3, moreover, comprises capacitors C5 and C6, resistors R5 and R6, and a diode D3, is turned on when −4 V is provided to the terminal V5 and +4 V is provided to the terminal V6, and is turned off when +4 V is provided to the terminal V5 and −4 V is provided to the terminal V6.

The high frequency switch SW4, moreover, comprises capacitors C7 and C8, resistors R7 and R8, and a diode D4, is turned on when −4 V is provided to the terminal V7 and +4 V is provided to the terminal V8, and is turned off when +4 V is provided to the terminal V7 and −4 V is provided to the terminal V8.

The high frequency switch SW5, moreover, comprises capacitors C9 and C10, resistors R9 and R10, and a diode D5, is turned on when −4 V is provided to the terminal V9 and +4 V is provided to the terminal V10, and is turned off when +4 V is provided to the terminal V9 and −4 V is provided to the terminal V10.

In such a structure, only the high frequency switch SW3 is turned on at the time of reception at the base station 100, and the other high frequency switches SW1, SW2, SW4, and SW5 are off. In this state, the high frequency signal received by the antenna 101 is output to the reception high frequency circuit 104, and the high frequency signal received by the antenna 102 is output to the reception high frequency circuit 105. The high frequency signal from the transmission high frequency circuit 106, moreover, is grounded via the high frequency switch SW3, and is consequently output neither from the antenna 101 nor from the antenna 102.

In the case of transmission from the base station 100, moreover, the antenna from the antennas 101 and 102 having the better reception sensitivity is used to perform transmission. For example, when the antenna 101 has better reception sensitivity than the antenna 102, the high frequency switches SW1 and SW4 are turned off, and the high frequency switch SW3 is turned on. In this case, the high frequency signal from the transmission high frequency circuit 106 is output from the antenna 101.

Conversely, when the antenna 102 has better reception sensitivity than the antenna 102, the high frequency switches SW2 and SW5 are turned off, and the high frequency switch SW3 is turned on. In this case, the high frequency signal from the transmission high frequency circuit 106 is output from the antenna 102.

The mobile station 200 of the digital mobile communication apparatus shown in FIG. 9 is equipped with a single antenna 201; this antenna 201 is connected to a transmission high frequency circuit 203 and a reception high frequency circuit 204 via an antenna switch 202.

This transmission high frequency circuit 203 is connected to the voice input/output terminal of a headset 216 and a microphone 210 via a channel CODEC 206 and a voice CODEC 207, and the reception high frequency circuit 204 is connected to a speaker 211 via the channel CODEC 206 and the voice CODEC 207, and is connected to the voice output terminal of the headset terminal 216 via an amp 214 and a diode circuit 215.

The output of a frequency synthesizer 205, moreover, is provided to the transmission high frequency circuit 203 and the reception high frequency circuit 204.

A control circuit 208 is moreover connected to the frequency synthesizer 205, the channel CODEC 206, and the voice CODEC 207, and the operation of these circuits is controlled by this control circuit 208.

An ID memory 209 for storing ID codes for identifying this mobile station 200 is moreover connected to the control circuit 208, and a sounder 213 for call-in notification is moreover connected to this control circuit 208 via an amp 212.

A battery pack 220 is moreover connected to this mobile station 200, and the DC 4.8 V output from this battery pack 220 is supplied to a power source circuit 217; the power source circuit 217 is structured so as to supply power to each component of the mobile station 200.

The embodiment depicts cases in which the selective diversity apparatus of this invention is used for the base station of a digital mobile communication apparatus, but the selective diversity apparatus of this invention can also be used, in the same fashion, for the mobile station of a digital mobile communication apparatus.

INDUSTRIAL APPLICABILITY

As described above, this invention is structured so that branch judgment and switching are performed in the preamble signal zone for the reception of a control physical slot for which the preamble signal zone is sufficiently long, and for the reception of a communication physical slot for which the preamble signal zone is short, branch judgment is performed based on a timing that is the same as that for the reception of the control physical slot, but the switching thereof is performed in the next guard time; this makes it possible to offer a selective diversity apparatus, and a method for the control thereof, that does not give rise to signal errors during branch switching, that is suitable for use in a digital mobile communication apparatus, and that makes it possible to realize goals such as cost reduction, power consumption reduction, and apparatus size reduction.

We claim:

1. A selective diversity apparatus comprising:
a plurality of antennas;
a plurality of receiving circuit branches, respectively provided in association with the plurality of antennas, for receiving reception signals of the respective antennas, each signal communicated over a time slot, each time slot including a preamble signal period, and a guard time period being disposed between the time slots;
a plurality of level detection means for detecting reception levels of the respective receiving circuit branches;
judgment means for judging which one of the receiving circuit branches has a largest reception level based on detection outputs of the plurality of level detection means;
selection means for selecting the one of the plurality of receiving circuit branches based on a judgment output of the judgment means; and
enabling means responsive to the selection means for enabling the judgement means in the preamble period and for enabling the selection means in the guard time period.

2. A selective diversity apparatus comprising:
a plurality of antennas;
a plurality of receiving circuit branches, respectively provided in association with the plurality of antennas, for receiving reception signals of the respective antennas, each signal communicated over a time slot, each slot including a preamble signal period, and a guard time period being disposed between the time slots;
a plurality of level detection means for detecting reception levels of the respective receiving circuit branches;
judgment means for judging which one of the receiving circuit branches has a largest reception level based on detection outputs of the plurality of level detection means; and
selection means for selecting the one of the plurality of receiving circuit branches based on a judgment output of the judgment means,
wherein the signals received by the antennas are signals in the form of bursts that have a frame structure comprising a plurality of time slots; the burst-form signals comprise preamble signals in each time slot, and also comprise a communication physical slot and a control physical slot for which a guard time has been established between the slots; the period of the preamble signal of the control physical slot is set to be longer than the period of the preamble signal of the communication physical slot, and
wherein a first timing and a second timing are set in the period of the preamble signal at the time of the reception of the control physical slot; the first timing is set to be identical to that for the reception of the control physical slot and the second timing is set in the period of the guard time when the communication physical slot is received.

3. A selective diversity apparatus comprising:
a plurality of antennas for receiving signals in the form of bursts that have a frame structure comprising a plurality of slots including a control physical slot containing a first preamble signal and a communication physical slot containing a second preamble signal being set to be shorter than the first preamble signal, in which a guard time has been established between each of the slots;
a plurality of receiving circuit branches, respectively provided in association with the plurality of antennas, for receiving signals received by the respective antennas;
a plurality of level detection means for detecting reception levels of the receiving circuit branches;
judgment means, based on detection outputs of the plurality of level detection means, for judging which one of the receiving circuit branches has a highest reception level at a first timing which has elapsed for a predetermined period of time from a head of the control physical slot which is within a period of the first preamble signal when the control physical slot is received and, for judging which one of the receiving circuit branches has a highest reception level at a second timing which has elapsed for the same period of time as the predetermined period of time from a head of the communication physical slot when the communication physical slot is received; and selection means, based on a judgment output of the judgment means, for selecting one of the plurality of receiving circuit branches at a third timing within the period of the first preamble signal when the control physical slot is received and, for selecting one of the plurality of receiving circuit branches at a fourth timing within a period of the guard time when the communication physical slot is received.

4. A method for controlling a selective diversity apparatus, comprising the steps of:

receiving, at a plurality of antennas, signals in the form of bursts that have a frame structure comprising a plurality of slots including a control physical slot containing a first preamble signal and a communication physical slot containing a second preamble signal shorter than the first preamble signal, in which a guard time has been established between each of the slots;

judging which one of the plurality of antennas has a highest reception level at a first timing within a period of the first preamble signal which has elapsed for a predetermined period of time from a head of the control physical slot when the control physical slot is received and, for selecting the judged antenna at a second timing within the period of the first preamble signal; and judging which one of the plurality of antennas has a highest reception level at a third timing which has elapsed for the same period of time as the predetermined period of time from a head of the communication physical slot when the communication physical slot is received and, for selecting the judged antenna at a fourth timing within a period of the guard time.

* * * * *

UNITED STATES PATENT AND TRADEMARK OFFICE
CERTIFICATE OF CORRECTION

PATENT NO. : 5,781,592
DATED : July 14, 1998
INVENTOR(S) : Atsushi MASUDA

It is certified that error appears in the above-identified patent and that said Letters Patent is hereby corrected as shown below:

Title Page, Item [57], in the Abstract, line 11, "judgement" should read --judgment--.

Claim 1, column 12, line 2, "judgement" should read --judgment--.

Signed and Sealed this

Third Day of April, 2001

Attest:

NICHOLAS P. GODICI

Attesting Officer

Acting Director of the United States Patent and Trademark Office